(12) United States Patent
Wallén et al.

(10) Patent No.: US 7,903,769 B2
(45) Date of Patent: Mar. 8, 2011

(54) METHOD AND APPARATUS FOR PHASE-NOISE COMPENSATION IN DIGITAL RECEIVERS

(75) Inventors: Anders Wallén, Eslöv (SE); Leif Wilhelmsson, Dalby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 674 days.

(21) Appl. No.: 11/301,100

(22) Filed: Dec. 12, 2005

(65) Prior Publication Data

US 2007/0133721 A1   Jun. 14, 2007

(51) Int. Cl.
*H03D 1/04* (2006.01)
*H03D 3/24* (2006.01)

(52) U.S. Cl. .................. 375/346; 375/376

(58) Field of Classification Search .............. 375/346, 375/376, 316, 327, 330, 371, 278, 254, 284, 375/285; 327/156, 159; 329/325, 360
See application file for complete search history.

(56) References Cited

U.S. PATENT DOCUMENTS

| | | | |
|---|---|---|---|
| 4,918,747 A | 4/1990 | Bekooij | |
| 5,287,067 A | 2/1994 | Denno et al. | |
| 5,440,265 A | 8/1995 | Cochran et al. | |
| 5,497,400 A | 3/1996 | Carson et al. | |
| 6,456,671 B1 | 9/2002 | Patire | |
| 6,625,231 B1 | 9/2003 | Shen | |
| 6,636,092 B1 * | 10/2003 | Stine | 327/159 |
| 6,961,628 B2 * | 11/2005 | Yutkowitz | 700/37 |
| 2002/0159539 A1 | 10/2002 | Alcock et al. | |
| 2004/0036528 A1 | 2/2004 | Smit | |
| 2004/0136480 A1 | 7/2004 | Smit | |
| 2004/0190637 A1 | 9/2004 | Maltsev et al. | |
| 2004/0252788 A1 | 12/2004 | Smit | |
| 2008/0181292 A1 * | 7/2008 | Yang et al. | 375/232 |

FOREIGN PATENT DOCUMENTS

| | | |
|---|---|---|
| EP | 0316842 B1 | 9/1994 |
| EP | 1-241-846 A2 | 9/2002 |
| EP | 1 408 663 A2 | 4/2004 |
| EP | 1 439 658 A1 | 7/2004 |
| WO | WO2004/004268 | 1/2004 |
| WO | WO 2004/004268 A1 | 1/2004 |
| WO | WO 2004/066549 A1 | 8/2004 |
| WO | WO 2004/086709 A1 | 10/2004 |

OTHER PUBLICATIONS

Mutsumu Serizawa, et al., "Phase-Tracking Viterbi Demodulator" Electronics & Communications in Japan, Part I—Communications, Wiley, Hoboken, NJ, UA, vol. 79, No. 1, Jan. 1996; pp. 82-96, XP000553793; ISSN: 8756-6621.

(Continued)

*Primary Examiner* — Khai Tran (57) ABSTRACT

A method and apparatus for compensation of noise in a received signal includes receiving a received signal comprised of a sum of a transmitted signal and a disturbance signal in a demodulator, summing the received signal and a compensation signal to produce a demodulation signal, determining a transmitted symbol based upon the demodulation signal, determining an error signal by calculating a difference between the demodulation signal and the determined transmitted symbol, and determining the compensation signal from the error signal using a model-based disturbance suppression control process. In at least one embodiment, the model-based disturbance suppression control process is a linear disturbance model control process.

22 Claims, 7 Drawing Sheets

OTHER PUBLICATIONS

Wenzhen Li, et al., "A New Receiver Architecture for Joint Carrier, Channel, and Data Estimation for High-Rate WPAN Systems" VTC 2002-Fall. 2002 IEEE 56th Vehicular Technology Conference Proceedings. Vancouver, Canada Sep. 24-28, 2002, IEEE Vehicular Technology Conference, New York NY: IEEE, USA, vol. 1 of 4. Conference 56, Sep. 24, 2002, pp. 1637-1641, XP010608706: ISBN; 0-7803-7467-3.

M. Sternad, A. Ahlén and E. Lindskog, "Robust Decision Feedback Equalizers," *IEEE International Conference on Acoustics, Speech and Signal Processing*, Minneapolis, MN, vol. 111, pp. 555-558, Apr. 27-30, 1993.

P. Pánek, "Time Scale Synchronization Using Adaptive LQG Control Algorithm," *Proceedings of the 13th International Czech-Slovak Scientific Conference, Radioelektronika 2003*, May 6-7, 2003, pp. 475-478.

D. Petrovic, W. Rave and G. Fettweis, "Phase Noise Suppression in OFDM Using a Kalman Filter," *Proc. IEEE WPMC*, vol. 3, pp. 375-379. Yokosuka, Japan, Oct. 19-22, 2003.

R. Fraanje, *Robust and Fast Schemes in Broadband Active Noise and Vibration Control.*, Ph.D Thesis, University of Twente, The Netherlands, 2004.

K. J. Åström, and B. Wittenmark, *Computer Controlled Systems*, pp. 408-446, Third Edition, Prentice-Hall, 1997.

H. Leib, "Data-Aided Nonchoerent Demodulation of DPSK," IEEE *Transactions on Communications*, pp. 722-725, vol. 43, No. 2/3/4, Feb./Mar./Apr. 1995.

M. Sternad, and A. Ahlén, *A Polynomial Approach to $H_2$ and $H_{2o}$ Robust Control Design*, Chapter 5 in M. Grimble and V. Kučera ed., Springer-Verlag, London, 1996.

X. Liu and A. Goldsmith, "Wireless Communication Tradeoffs in Distributed Control," *Proc. IEEE Conference on Decision and Control*, Dec. 2003.

V. Gupta, D. Spanos, B. Hassibi and R. M. Murray, "Optimal LQG Control Across a Packet-Dropping Link," submitted *IEEE T. Automatic Control*, pp. 1-15, Aug. 12, 2004.

A. J. Connolly, B. F. La Scala, and P.J. Kootsookos, "Closed-Loop Frequency Tracking and Rejection," pp. 1-6, Submission to the IFAC Conference on Control of Industrial Systems, May 1997, Belfort, France.

\* cited by examiner

METHOD AND APPARATUS FOR PHASE-NOISE COMPENSATION IN DIGITAL RECEIVERS

TECHNICAL FIELD

The present invention relates generally to demodulation in digital receivers and, more particularly, but not by way of limitation to receivers in which decision directed demodulation is used.

BACKGROUND

In digital communications in general and in wireless communications in particular, the transmitted data is disturbed by a number of different imperfections. For example, when the signal is transmitted over a channel, it might be interfered with by other signals, or it might be distorted because the transmission channel is time-dispersive. Also, the signal will usually be significantly attenuated by the transition channel. In addition to the disturbances caused by the channel, the transmitter and the receiver will also distort the transmitted signal. The major non-idealities in transmitters are caused by phase noise and non-linearity in the power amplifier of the transmitter. For the receiver, the major imperfections to consider are non-linearities in the receiver front-end and phase noise. The phase-noise, both in the transmitter and the receiver, is primarily caused by the jitter in the frequency synthesizer of the carrier signal.

In order to limit the effect of non-linearities in the transmitter as well as in the receiver, it is advantageous to use signals with constant envelopes. This is for instance the case in GSM and in Bluetooth, see for example, J. C. Haartsen, "The Bluetooth radio system," IEEE Personal Communications, vol. 7, No. 1, February 2000. In constant amplitude signals no information is transmitted in the amplitude, and all information is in the phase of the transmitted signal. A severe impairment for systems using this type of modulation is therefore the above mentioned phase noise. Since the phase noise is generated at both the transmitter and the receiver, its negative effect cannot be eliminated merely by making the received signal stronger. Often, problems with phase noise are counteracted by designing the system such that the effect of the phase noise will be negligible. This can, e.g., be achieved by the use of powerful error correcting coding. In many cases, the error correcting code is required anyway, and the effects of phase noise will not be an issue.

However, there are situations when it is desirable not to use error correcting coding. One such example is Bluetooth, where uncoded transmission is used to achieve the highest throughput. In fact, for systems operating in the unlicensed ISM band at 2.4 GHz, error correcting coding is usually not very effective. Instead, it is often preferable to use only error detecting coding since error correcting coding is not efficient if the channel conditions change greatly during transmission. That is, either the channel is so good that error correcting coding is not required, or the channel is so poor that the error correcting code is simply not powerful enough to correct the errors present in the transmitted signal. These two cases typically correspond to a situation in which an interfering signal is absent and present, respectively.

Since in many situations it is not desirable to use error correcting coding merely to deal with phase noise, it would be desirable to be able to use an uncoded transmission that still does not suffer too much from phase noise. A simple way to achieve this result is to use differential demodulation in which the receiver will first differentiate the signal before extracting the information. Since the phase noise typically is a relatively slow process because its bandwidth is significantly smaller than the symbol rate, such a differentiation significantly reduces the negative effects of phase noise. However, it is well known that a non-coherent differential receiver suffers in sensitivity compared to a coherent one, and an even greater disadvantage of a non-coherent differential receiver is that it is much more sensitive to channel imperfections such as time-dispersion. Thus, there is a tradeoff in the ability to handle phase noise and the ability to handle time-dispersion effects. Specifically, one can either choose to use a non-coherent receiver to counteract the phase noise, or one can choose a coherent receiver to obtain good performance in time-dispersive channels. Consequently, if one has to counteract the phase noise, then the performance in time-dispersive channels will be poor.

In accordance with at least one embodiment of the present invention, a method and an apparatus is provided in which the above mentioned trade-off is avoided. At least one other embodiment of the present invention provides for the use of a coherent receiver, or close to coherent receiver, in which the effect of phase noise does not have a devastating impact on performance.

BRIEF SUMMARY OF THE INVENTION

In the present disclosure, a method and apparatus for phase noise compensation is described. The method operates in a decision directed fashion, and is preferably used together with a semi-coherent demodulator. By exploiting the fact that the phase noise and the thermal noise in the receiver have different characteristics, the phase noise can be estimated and to some extent be compensated for. An embodiment of the present invention is directed to a method for compensation of noise in a received signal including the steps of receiving a received signal in a demodulator, the received signal comprised of a sum of a transmitted signal and a disturbance signal; summing the received signal and a compensation signal to produce a demodulation signal; and determining a transmitted symbol based upon the demodulation signal. The method further includes determining an error signal by calculating a difference between the demodulation signal and the determined transmitted symbol, and determining the compensation signal from the error signal using a model-based disturbance suppression control process to reduce the influence of the disturbance signal on the received signal. In at least one embodiment of the present invention, the model-based disturbance suppression control process is a linear disturbance model control process, for example, a linear quadratic Gaussian (LQG) control process. In at least one embodiment of the present invention, the disturbance signal includes phase noise.

A demodulator in accordance with an embodiment of the present invention includes a receiver adapted to receive a received signal, the received signal comprised of a sum of a transmitted signal and a disturbance signal; a summer adapted to sum the received signal and a compensation signal to produce a demodulation signal; and a decision unit adapted to determine a transmitted symbol based upon the demodulation signal. The demodulator further includes a subtractor adapted to determine an error signal by calculating a difference between the demodulation signal and the determined transmitted symbol; and a compensation unit adapted to determine the compensation signal from the error signal using a model-based disturbance suppression control process to reduce the influence of the disturbance signal on the received signal. In at least one embodiment of the present invention, the model-based disturbance suppression control process is a linear disturbance model control process, for example, a linear quadratic Gaussian (LQG) control process. In at least one embodiment of the present invention, the disturbance signal includes phase noise.

BRIEF DESCRIPTION OF THE DRAWINGS

A more complete understanding of the present invention may be obtained by reference to the following Detailed Description of Illustrative Embodiments of the Invention, when taken in conjunction with the accompanying Drawings, wherein.

DETAILED DESCRIPTION OF THE INVENTION

Embodiments of the invention will now be described more fully with reference to the accompanying Drawings. The invention may, however, be embodied in many different forms and should not be construed as limited to the embodiments set forth herein. The invention should only be considered limited by the claims as they now exist and the equivalents thereof.

To aid in the description of an embodiment of the method of the present invention, the present description is based on data that is transmitted using differential binary phase shift keying (DBPSK). The received symbol spaced samples $r_k$ at time k are denoted by:

$$r_k = s_k + n_k \quad (1)$$

where $s_k \in \{-1,1\}$ is representative of a transmitted symbol, and $n_k$ is a noise term containing both thermal noise, which is usually assumed to be white and Gaussian, and the phase noise. In the case in which the demodulation is performed non-coherently, the received signal is differentiated in accordance with the following equation:

$$d_k = r_k r_{k-1}^* \quad (2)$$

where * denotes a complex conjugate operation, and the decision is then based on the sign of the real part of $d_k$.

If instead coherent detection is used, a decision is first made on $s_{k-1}$ and $s_k$, here denoted by $\hat{s}_{k-1}$ and $\hat{s}_k$, respectively. Then, $d_k$ is obtained as:

$$d_k = \hat{s}_k \hat{s}_{k-1} \quad (3)$$

That is to say, $d_k=1$ if $\hat{s}_k = \hat{s}_{k-1}$ and $d_k=0$ otherwise.

As is commonly known, the disadvantage of performing non-coherent demodulation according to Equation 2 is a loss in performance. In the case of DBPSK the loss in performance is typically about 1 dB, depending on what error rate is considered, but in the case of non-binary symbol alphabets the loss becomes larger. However, coherent detection according to Equation 3 requires that a phase reference is available, so the loss in performance with non-coherent demodulation is often accepted in order to allow for a less complex receiver.

Returning to Equation 2, the reason for the worse performance can be explained by the fact that the phase reference $r_{k-1}$ is as noisy as the signal $r_k$ itself, thus the decision variable $d_k$ will be affected more by noise than $r_k$. For coherent reception, assuming that the decision on symbol $\hat{s}_{k-1}$ is correct, the reference will be noiseless and the probability of error equals the probability that an error is made with respect to $r_k$.

In order to reduce the gap in performance between non-coherent and coherent demodulation without adding too much complexity to the receiver, a so-called semi-coherent demodulator can be used as described in H. Leib, "Data-aided noncoherent demodulation of DPSK," *Trans. on Commun.*, pp. 722-725., No. 2/3/4, February/March/April 1995. A semi-coherent demodulator is based on the idea that the phase reference can be built up in a decision directed fashion, and that the reference phase can be made less noisy by filtering. The coherency of a semi-coherent demodulator is typically determined by a coherency parameter α, as described in, for instance, U.S. patent application Ser. No. 10/459,604, filed Jun. 12, 2003.

U.S. patent application Ser. No. 10/459,604 describes a semi-coherent modulator in which a reference signal $u_i$ is created from removing an impact of modulation on an input signal $x_i$. The reference signal $u_i$ may remain disturbed by impairments such as noise and intersymbol interference (ISI). The impairments may be averaged out by integration at an integrator that operates in the complex domain in order to ensure that the amplitude of the semi-coherent demodulator is considered. The coherency parameter α is input with the reference signal $u_i$ to form the output of the integrator, a reference vector $r_i$. Many approaches may be employed to integrate the reference signal $u_i$. In one approach described in U.S. patent application Ser. No. 10/459,604, an exponential integration window yields the following equation:

$$r_i = \alpha * r_{i-1} + (1-\alpha) * u_i, i=1,2,3 \quad (4)$$

By letting α=0, no filtering is performed, and the fully non-coherent demodulator is obtained. Likewise, by letting α→1, the performance approaches that of a coherent demodulator. A reason for using a semi-coherent demodulator instead of a fully coherent one is that in case there is a frequency offset in the received signal, the semi-coherent demodulator will be able to handle this by continuously updating the reference phase. The coherence parameter a should be chosen small enough to allow for the expected frequency offset, but still large enough to make sure that the reference phase is filtered as much as possible.

In many situations, the disturbance will, in addition to white Gaussian noise and frequency offset, also include phase noise. In this case, the phase noise is not white, but is correlated between two consecutive samples taken at the symbol rate. Specifically, the bandwidth of the phase noise is significantly smaller than the symbol rate. Referring again to Equation 2, it follows that the effect of phase noise will be attenuated for a non-coherent demodulator. On the other hand, for a coherent demodulator, the phase noise will add to the white noise so that the total noise power is effectively increased.

Returning to the semi-coherent demodulator, it can be seen that in order to counteract an increasing amount of phase noise $\alpha$ has to be reduced, so that one has to defer to using a demodulator whose performance may be poor as a simple noncoherent one. The reason for this short-coming of the semi-coherent demodulator when it comes to phase noise is that it is treated as being white noise.

In accordance with at least one embodiment of the present invention, a method and apparatus is described which avoids these shortcomings and provides for an estimation and compensation of phase noise in a demodulator. Embodiments of the present invention further describe a method which takes the correlation properties (the bandwidth) of the phase noise into consideration, and thereby results in a demodulator with improved performance.

The problem formulation in accordance with various embodiments of the present invention is inspired by Linear Quadratic Gaussian (LQG) control theory. The LQG control technique is typically used to generate a control signal to adaptively control the operation of a plant by measuring the output of the plant subject and generating the control signal, taking into account disturbance and measurement noise which may affect the output. The LQG, using a linear model of the plant to be controlled, and the products measure of a quantity, such as the variance, should be optimized. LQG design requires a state-space model of the plant to be formulated. According to the LQG technique, a controller is designed to produce control signals u to control an output y of a plant subject to disturbance w. The plant model state space equations are of the form:

$$x(k+1)=Ax(k)+Bu(k)+Gw(k)$$

$$y(k)=Cx(k)+Du(k)+Hw(k) \quad (5)$$

where x represents a state vector of the plant, y represents an output of the plant, u represents control signals, w is modeled as white Gaussian noise, and k represents the discrete-time time index.

Typically a Kalman filter is used to generate a state estimate $\hat{x}$ such that $u=-L\hat{x}$ remains optimal for the output-feedback problem, with L being representative of a minimizing gain matrix. This state estimate is generated by the Kalman filter according to the equation:

$$\hat{x}(k+1)=A\hat{x}(k)+Bu(k)+K(y(k)-C\hat{x}(k)-Du(k)) \quad (6)$$

with K representative of the Kalman gain, obtained as a solution to an algebraic Riccati equation. The Kalman filter is an optimal estimator when dealing with Gaussian noise.

In accordance with the various embodiments of the method of the present invention, the problem must be converted into a suitable formulation so that the principles of LQG control theory can be applied for noise compensation in a demodulator. This is described for a semi-coherent demodulator and subsequently for a phase-noise compensation case. Although various embodiments of the present invention are described as using a LQG control process, it should be understood that the principles of the present invention can be applied to other model-based disturbance suppression control process techniques, e.g., other linear disturbance model control processes.

Figure 1:
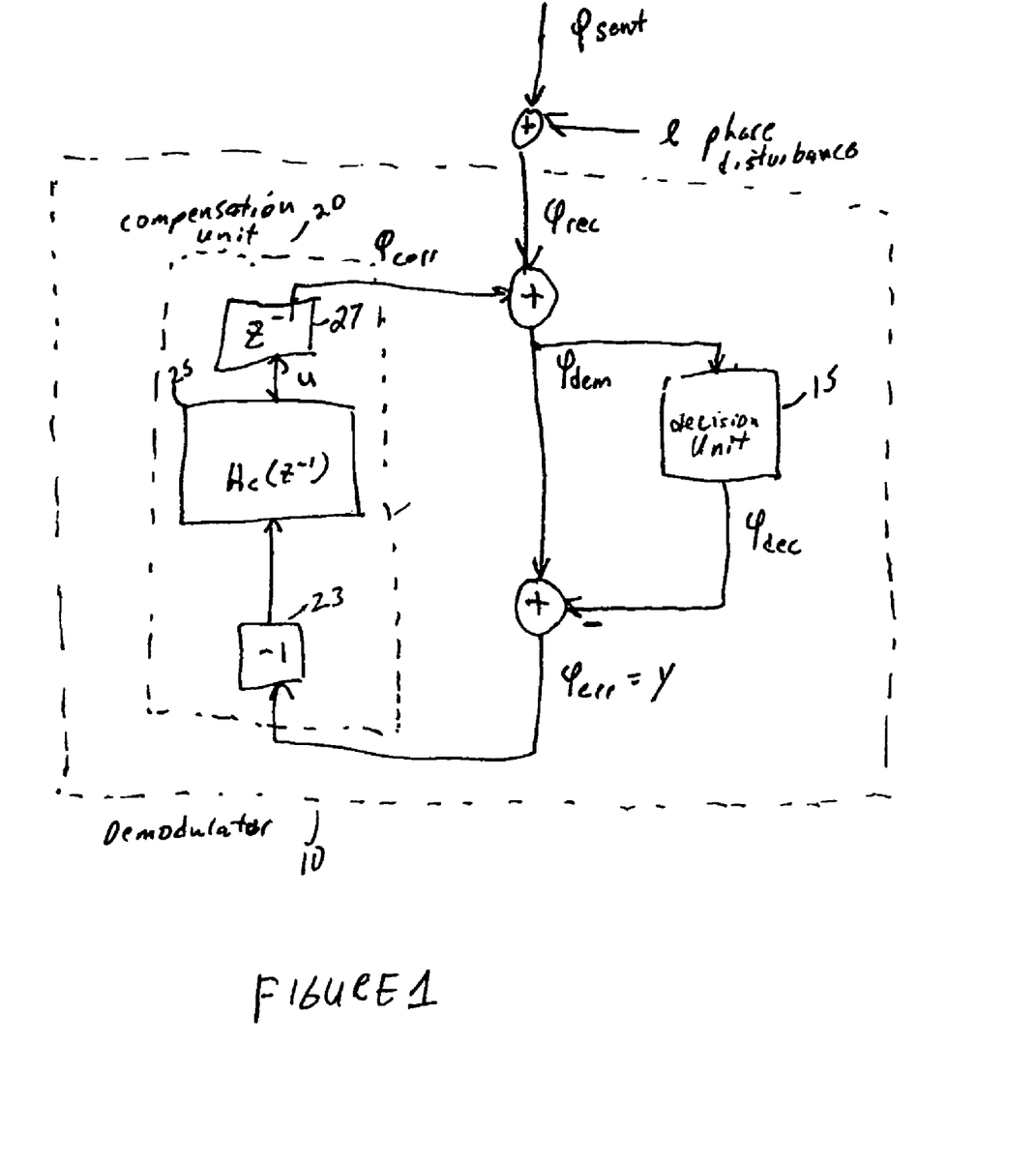
FIG. 1 is a block diagram of a demodulator having a mechanism for compensation of phase errors.
Figure 2A:
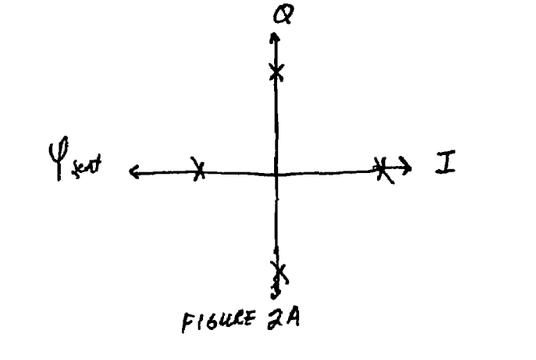
FIG. 2A-2E are symbol constellation diagrams for an exemplary (D)QPSK modulated signal.
Figure 2B:
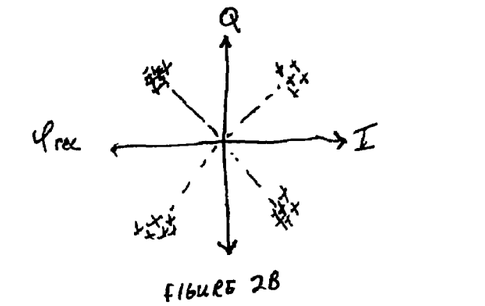

Referring now to FIG. 1, a block diagram of a demodulator having a mechanism for compensation of phase errors, such as those caused by constant error, phase noise, additive white Gaussian noise (AWGN), etc., is illustrated. A transmitter sends symbols represented with a particular phase $\phi_{sent}$ in the I-Q plane. For an example (D)QPSK modulation signal, possible values of $\phi_{sent}$ at any instant can be taken as 0, $\pi/2$, $\pi$, or $-\pi/2$ as illustrated in FIG. 2A. The propagation channel and the receiver front-end adds a phase disturbance signal l to the phase of the sent symbol such that the demodulator 10 receives a received signal with a phase $\phi_{rec}=\phi_{sent}^{+l}$. This is illustrated in FIG. 2B which shows noisy and phase rotated samples compared to those in FIG. 2A. In accordance with at least one embodiment of the present invention, the received signal may be filtered using a filter that functions to optimally attenuate the disturbance signal l.

Figure 2C:
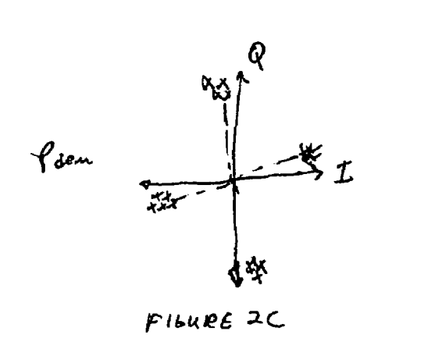
Figure 2D:
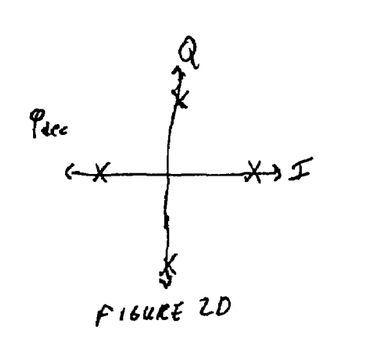
Figure 2E:
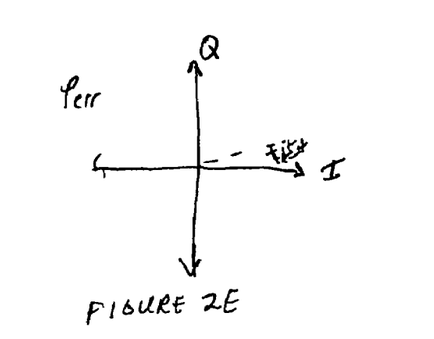

In the demodulator structure in accordance with an embodiment of the present invention as illustrated in FIG. 1, a demodulated signal $\phi_{dem}$ is then created by adding a compensation signal $\phi_{corr}$ to the received phase $\phi_{rec}$ such that $\phi_{dem}=\phi_{rec}+\phi_{corr}$. The intent of the compensation signal $\phi_{corr}$ is to reduce the impact of the phase disturbance l on the received signal. This procedure results in a signal constellation in which the (D)QPSK samples have been moved closer to the real and imaginary axes, for example as illustrated in FIG. 2C. A decision unit 15 is then used to choose the closest admissible phase value $\phi_{dec}$ as the decided phase value representative of the phase of the transmitted signal, as illustrated for example in FIG. 2D. By calculating a phase difference, or phase error signal, $\phi_{err}$ between $\phi_{dem}$ and $\phi_{dec}$ ($\phi_{err}=\phi_{dem}-\phi_{dec}$), the effects of modulation is substantially removed, so that all samples are located close to the positive real axis, as illustrated for example in FIG. 2E. The error signal $\phi_{err}$ is then used as input to a compensation unit 20 which is responsible for calculating a new value of $\phi_{corr}$ that will be used for the next received signal. The compensation unit is symbolically represented in FIG. 1 as including a negative feedback loop represented by gain block 23, a filter 25, and a unit delay 27. The objective is to find a transfer function $H_c(z^{-1})$ of the filter 25 which functions to make the phase errors $\phi_{err}$ as small as possible. In accordance with at least one embodiment of the present invention, a disturbance model is input into a linear quadratic Gaussian (LQG) design to produce the transfer function $H_c(z^{-1})$ of the filter 25. In accordance with at least one embodiment of the present invention, it may be desirable to filter the received signal using a low pass filter to reduce white noise before further processing of the received signal.

Figure 3:
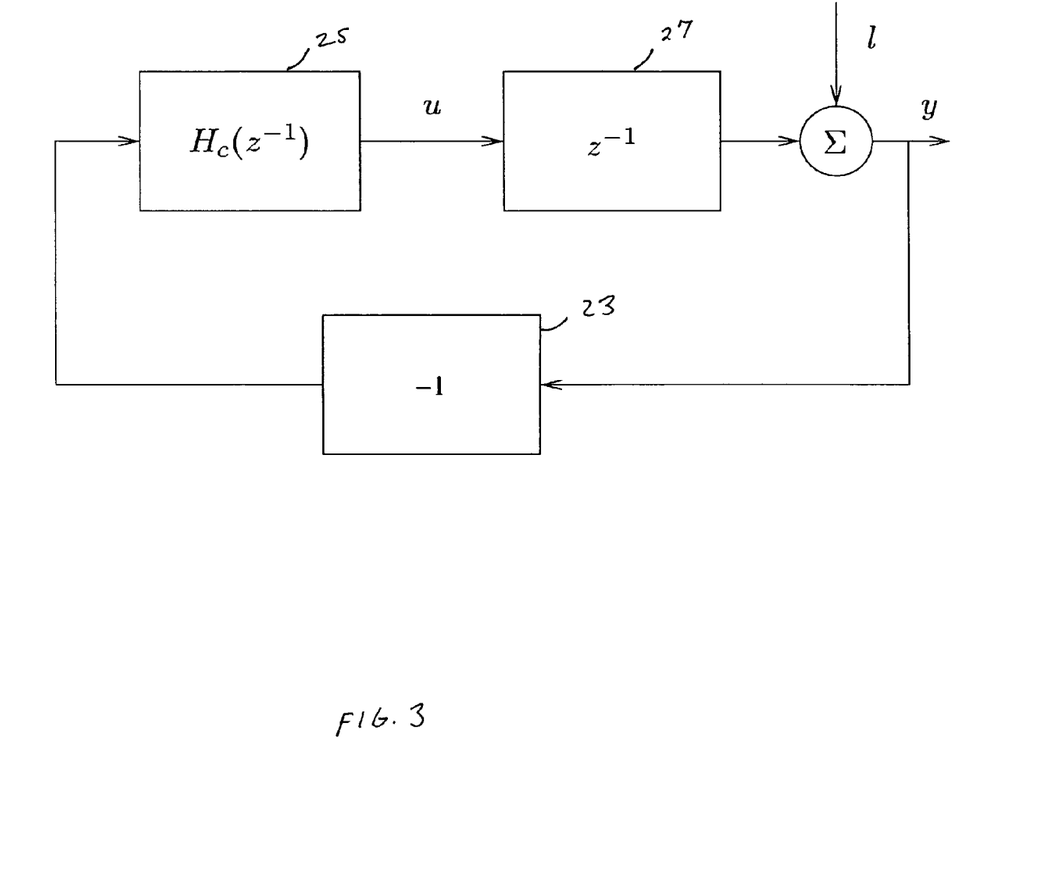
FIG. 3 is a simplified block diagram which emphasizes the feedback control nature of a semi-coherent demodulator.

By removing the effects of the signal modulation and the decision unit, the system of FIG. 1 can be redrawn into a control problem setup of the type illustrated in FIG. 3. Referring to FIG. 3, a simplified block diagram which emphasizes the feedback control nature of a semi-coherent demodulator is illustrated. Similarly to FIG. 1, the feedback control loop includes a gain block 23, a filter 25, and a unit delay 27. The signal y is equivalent to the signal $\phi_{err}$, i.e., the signal that is to be kept as small as possible. The signal u represents the control signal to be used for the next received symbol, i.e. $u(k-1)=\phi_{corr}(k)$, with k being the symbol index in time. In accordance with embodiments of the present invention the filter 25 may be implemented using a controller or microprocessor, for example.

Still referring to FIG. 3, an LQG formulation of a semi-coherent demodulator in accordance with the present invention is further described. An LQG control design problem consists of a linear "process" (the unit delay, emanating from the tentative decision unit) for which it is desired to minimize a quadratic loss function (sums of variances) when subject to Gaussian noise input. The resulting optimal controller $H_c(z^{-1})$ is also linear. Further discussions of the theory of LQG can be found in many textbooks in control, for example, K. J.

Åstrom and B. Wittenmark, *Computer-Controlled Systems*, third edition, Prentice Hall 1997. In order to transfer a standard semi-coherent system into an LQG problem, it is needed to model the disturbance l as the output of a system with white noise inputs. The additive white Gaussian noise (AWGN) part of the disturbance fits directly into the LQG framework, but it is necessary to introduce the constant disturbance using a technique of modeling it as integrated white noise. This can be justified intuitively by noting that the impulse response of an integrator is exactly a constant. If it is desired to build a system which is able to track this constant at any time, the description of the disturbance must also include some randomness at the input of the integrator.

The disturbance model of the system is thus given by $$l = \begin{bmatrix} \frac{1}{z-1} & 1 \end{bmatrix} \begin{bmatrix} w_1 \\ w_2 \end{bmatrix} = \begin{bmatrix} \frac{1}{z-1} & 1 \end{bmatrix} w \quad (7)$$

where $w_1$ and $w_2$ are white Gaussian noise processes with variances $R_1$ and $R_2$, respectively. Thus, y is given by $$y(k) = u(k-1) + \begin{bmatrix} \frac{1}{z-1} & 1 \end{bmatrix} w \quad (8)$$

Figure 7A:
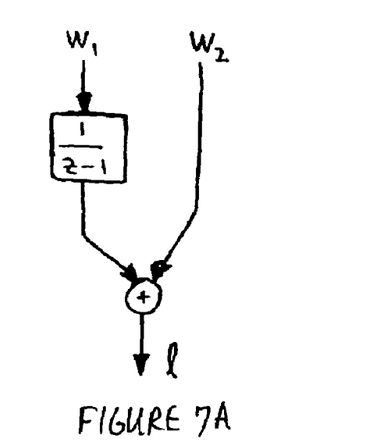
FIG. 7A illustrates a phase disturbance model capturing an offset and additive white Gaussian noise (AWGN)

FIG. 7A illustrates a phase disturbance model as described by Equation 7 which captures an offset and additive white Gaussian noise (AWGN) added together to form disturbance l.

The whole system can now be written in state-space form as:

$$x(k+1) = Ax(k) + Bu(k) + Gw(k) \quad (9)$$

$$= \begin{bmatrix} 0 & 0 \\ 0 & 1 \end{bmatrix} x(k) + \begin{bmatrix} 1 \\ 0 \end{bmatrix} u(k) + \begin{bmatrix} 0 & 0 \\ 1 & 0 \end{bmatrix} w(k)$$

$$y(k) = Cx(k) + Du(k) + Hw(k)$$

$$= \begin{bmatrix} 1 & 1 \end{bmatrix} x(k) + \begin{bmatrix} 0 & 1 \end{bmatrix} w(k)$$

where $Ax(k)$ is the current state, $x(k+1)$ is the next state, $u(k)$ is the current control signal, $w(k)$ is the current noise, $y(k)$ is a phase error to be minimized, and the state variables $x_1(k)=u(k-1)$ and $x_2(k)=\Sigma_{j<k}w_1(j)$. In accordance with the various embodiments of the invention, the variable D is set to a value of zero to simplify the state-space equations, and is unnecessary due to the built-in delay in the described embodiment.

The next step of the problem solution is to find the control signal $u(k)$ which minimizes the variance of $y(k)$. Since there is a unit delay from u to y, there is nothing to be done regarding the white noise term $w_2(k)$. To remove the term $w_1(k)$ completely it is desired to set $u(k)=-x_2(k+1)$. However, this is not possible for two reasons. First, it is not possible to look into the future, and second, $x_2$ is not a variable that can be measured, but only estimated. Thus, the best that can be achieved is to let $$u(k)=-\hat{x}_2(k+1|k)=-[0\ 1]A\hat{x}(k|k)=-L\hat{x}(k|k) \quad (10)$$

where $\hat{x}(k|k)$ denotes the optimal Kalman estimate of the state $x(k)$ using measurements up to time k. $\hat{x}(k|k)$ can be written as a linear combination of previous estimates $\hat{x}(k-1|k-1)$ and new measurements $y(k)$. Consequently $u(k)$ can be formed as $y(k)$ filtered through a linear transfer function.

Depending on the ratio between integrated and white noise ($R_1/R_2$), different Kalman filters and thus different controllers will be optimal. However, they will all be of the form $H_c(z^{-1})$=constant/$(1-z^{-1})$. More precisely, with $\alpha$ defined as in previous descriptions of the semi-coherent demodulator as a coherency parameter, the transfer function is given by $H_c(z^{-1})=(1-\alpha)/(1-z^{-1})$. The parameter value $\alpha$=0.9, which has been found to be a good value in many practical situations, corresponds to a relative power relation $R_1/R_2 \approx 0.01$. It can be noticed that the LQG formulation in this setup produces a controller with the same denominator as is present in the disturbance model.

It is straight-forward to see that the semi-coherent demodulator calculated here is able to remove a constant phase error in stationarity. Referring again to FIG. 3 it can be seen that the transfer function from the disturbance l to the phase error y can be expressed as $$H_{yl}(z^{-1}) = \frac{1}{1 + \frac{(1-\alpha)z^{-1}}{1-z^{-1}}} = \frac{1-z^{-1}}{1-\alpha z^{-1}} \quad (11)$$

which has a zero for z=1, and hence a constant error l will be out as expected.

Now that the principle of the LQG formulation has been described above, it is straightforward to extend the system to other, more complex disturbances, such as phase noise. A LQG formulation for phase noise compensation in accordance with the present invention will now be described. The goal is not to remove the phase noise effects completely, since this would not be possible. Rather, the LQG framework makes it possible to minimize the variance at, for example, the output of the system with varying noise components present. A methodology for phase noise compensation is described in two examples below, but it should be obvious to one of ordinary skill in the art that the principles of the present invention may be applied to other phase noise models as well.

To illustrate the use of a dynamic phase noise model, a first order example is considered. In this example, let the phase noise model be given in discrete time by a white-noise driven transfer function:

$$H_n(z) = \frac{\sqrt{1-\lambda^2}}{z-\lambda} \quad (12)$$

where $\lambda$ is a real constant with $|\lambda|<1$ which determines the bandwidth of the phase noise. $H_n(z)$ is normalized such that the phase noise at its output has the same power as the white noise at the input.

Figure 7B:
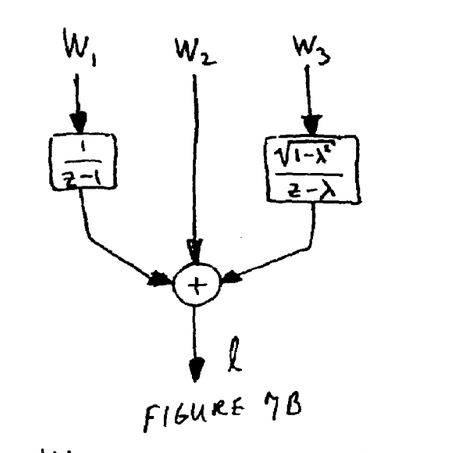
FIG. 7B illustrates a phase disturbance model capturing an offset, additive white Gaussian noise (AWGN), and a simple phase noise model.

The LQG design will now be exercised for the phase noise case with a simple first-order phase noise model. Adding the phase noise to the disturbance sources in the previous discussion results in a disturbance l expressed as:

$$l = \begin{bmatrix} \frac{1}{z-1} & 1 & H_n(z) \end{bmatrix} \begin{bmatrix} w_1 \\ w_2 \\ w_3 \end{bmatrix} = \begin{bmatrix} \frac{1}{z-1} & 1 & \frac{\sqrt{1-\lambda^2}}{z-\lambda} \end{bmatrix} w \quad (13)$$

where $w_3$ is white noise input with variance $R_3$ to the phase noise generating subsystem $H_n(z)$. FIG. 7B illustrates a phase disturbance model as described by Equation 13 which captures an offset, additive white Gaussian noise (AWGN), and a simple phase noise model added together to form disturbance l.

Compared to Equation 7, which corresponds to one state in Equation 9, there will be 1+1=2 states corresponding to Equation 13. A full state-space model of the system is then given by:

$$x(k+1) = Ax(k) + Bu(k) + Gw(k) \quad (14)$$

$$= \begin{bmatrix} 0 & 0 & 0 \\ 0 & 1 & 0 \\ 0 & 0 & \lambda \end{bmatrix} x(k) + \begin{bmatrix} 1 \\ 0 \\ 0 \end{bmatrix} u(k) + \begin{bmatrix} 0 & 0 & 0 \\ 1 & 0 & 0 \\ 0 & 0 & \sqrt{1-\lambda^2} \end{bmatrix} w(k)$$

$$y(k) = Cx(k) + Hw(k)$$

$$= -[0 \ 1 \ 1]x(k) + [0 \ 1 \ 0]w(k)$$

where the first state corresponds to the unit delay ("the process"), the second state to an unknown constant offset, and the third state to the phase noise model. It is convenient to chose a state-space representation as in Equation 14, where the output consists of the compensation action u(k−1), and the outputs of the disturbances. Similar to Equation 10, the optimal control is now given by:

$$u(k) = -\hat{x}_2(k+1|k) - \hat{x}_3(k+1|k) = -[0\ 1\ 1]\hat{x}(k+1|k) = -LA\hat{x}(k|k) \quad (15)$$

The optimal Kalman filter giving $\hat{x}(k|k)$ depends on the actual ratios between the disturbance variances $R_1$, $R_2$, and $R_3$, as well as the bandwidth of the phase noise which is determined by $\lambda$.

In situations in which the first order model described above is not an accurate model of the phase noise, a higher order, more realistic model of the phase noise that is valid in the pass-band is given in continuous time by a white-noise driven transfer function:

$$H_{nc}(s) = K \frac{3s/\omega_n + 1}{(s/\omega_n + 1)^3} \quad (16)$$

where K is a normalization constant, nc denotes noise continuous time, s is the Laplace transform variable, and $\omega_n$ is a constant which depends for example on the technology used. To obtain some numerical values for an example situation, it can be supposed that the demodulator is used for the enhanced data rate mode, henceforth referred to as the medium-rate (MR) mode, and a proposed high-rate (HR) modes of the Bluetooth system, which is described in J. C. Haartsen, "The Bluetooth radio system," *IEEE Personal Communications*, vol. 7, No. 1, February 2000. As nominal values, $\omega_n = 2\pi \times 50$ kHz can be used for medium rate (1 MHz symbol rate) and $\omega_n = 2\pi \times 120$ kHz can be used for high rate (4 MHz symbol rate). It should be noticed that the experienced bandwidth of the phase noise will be lower for high-rate, despite the higher actual bandwidth, due to the higher symbol rate. Sampling $H_{nc}(s)$ at symbol rate, the following discrete-time models with numerical parameters are obtained for the two cases:

$$H_{n,MR}(z) = \frac{0.23328(z - 0.90058)(z + 0.75621)}{(z - 0.73040)^3} \quad (17)$$

$$= \frac{0.23328 z^2 - 0.033677z - 0.15887}{z^3 - 2.1912z^2 + 1.6005z - 0.38966} \quad (18)$$

$$= \frac{b_1 z^2 + b_2 z + b_3}{z^3 + a_1 z^2 + a_2 z + a_3} \quad (19)$$

$$H_{n,HR}(z) = \frac{0.12038(z - 0.93910)(z + 0.84570)}{(z - 0.82820)^3} \quad (20)$$

$$= \frac{0.12038 z^2 - 0.011244z - 0.95605}{z^3 - 2.4846 z^2 + 2.0578 z - 0.56808} \quad (21)$$

Figure 7C:
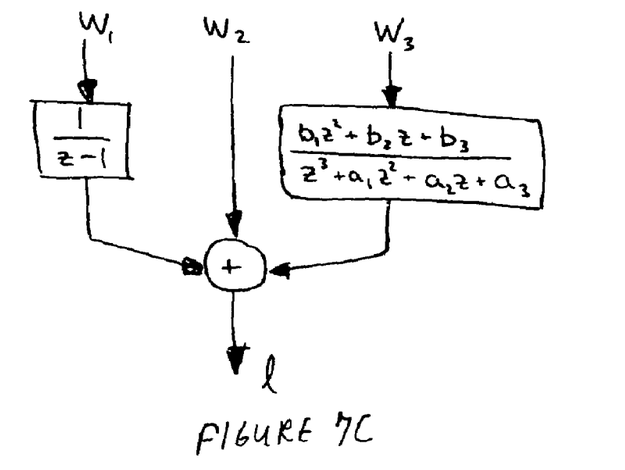
FIG. 7C illustrates a phase disturbance model capturing an offset, additive white Gaussian noise (AWGN), and a more advanced and more accurate phase noise model.

FIG. 7C illustrates a phase disturbance model as described by Equation 19 which captures an offset, additive white Gaussian noise (AWGN), and a more advance and more accurate phase noise model added together to form disturbance l.

Both transfer functions have been normalized such that white noise with unit variance at the input produces a phase noise with unit variance at the output. The positive zeros in the transfer functions correspond well with the continuous-time zeros in $H_{nc}(s)$, whereas the negative zeros are results from the sampling process.

The phase noise model can now be put into the LQG framework in a similar manner as for the first order phase noise model. Both the medium rate and the high rate solution are handled, depending on the coefficient selection. For medium rate, the disturbance l is given by $$l = \begin{bmatrix} \frac{1}{z-1} & 1 & H_{n,MR}(z) \end{bmatrix} \begin{bmatrix} w_1 \\ w_2 \\ w_3 \end{bmatrix} = \begin{bmatrix} \frac{1}{z-1} & 1 & H_{n,MR}(z) \end{bmatrix} w \quad (22)$$

where $W_3$ is white noise input with variance $R_3$ to the phase noise generating subsystem $H_{n,MR}$. A similar equation can be obtained for the high rate solution. Compared to Equation 13, which corresponds to 1+1=2 states in Equation 14, there will be 1+3=4 states corresponding to Equation 22. A full state-space model of the system is then given by:

$$x(k+1) = Ax(k) + Bu(k) + Gw(k) \quad (23)$$

$$= \begin{bmatrix} 0 & & & & \\ 1 & & & & \\ & -a_1 & 1 & 0 \\ & -a_2 & 0 & 1 \\ & -a_3 & 0 & 0 \end{bmatrix} x(k) + \begin{bmatrix} 1 \\ 0 \\ 0 \\ 0 \\ 0 \end{bmatrix} u(k) + \begin{bmatrix} 0 & 0 & 0 \\ 1 & 0 & 0 \\ 0 & 0 & b_1 \\ 0 & 0 & b_2 \\ 0 & 0 & b_3 \end{bmatrix} w(k)$$

$$y(k) = Cx(k) + Hw(k) = [1\ 1\ 1\ 0\ 0]x(k) + [0\ 1\ 0]w(k)$$

where the first state corresponds to the unit delay (the "process"), the second state to an unknown constant offset, and the third, fourth, and fifth states to the phase noise model. The empty elements in the A matrix are zeros, but omitted to emphasize the block-diagonal structure of the system. It is convenient to choose a state-space realization such that the output of the phase noise model corresponds to one state only ($x_3$). Similar to Equation 15, the optimal control is now given by:

$$u(k) = -\hat{x}_2(k+1|k) - \hat{x}_3(k+1|k) = -[0\ 1\ 1\ 0\ 0]\hat{x}(k+1|k) = -LA\hat{x}(k|k) \quad (24)$$

Again, the optimal Kalman filter giving $\hat{x}(k|k)$ depends on the actual ratios between the disturbance variances $R_1$, $R_2$, and $R_3$.

Figure 4:
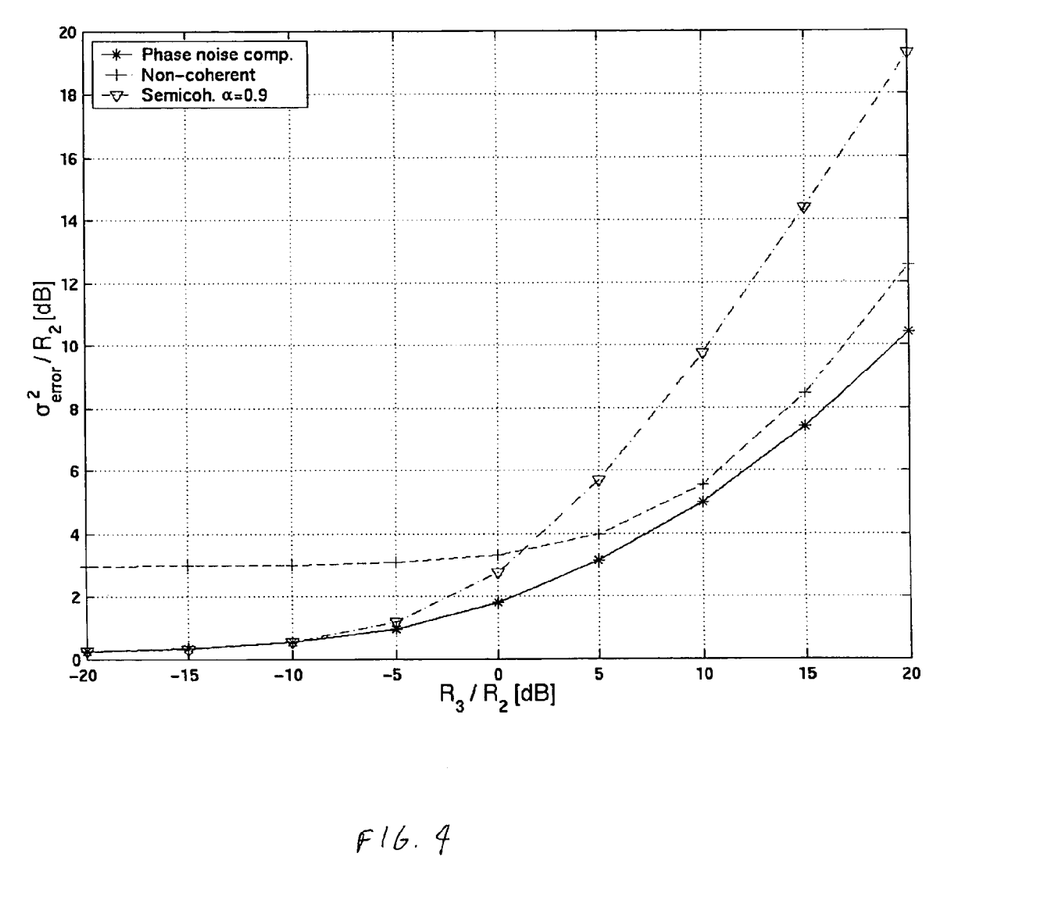
FIG. 4 illustrates a comparison of the variance of the error signal for semi-coherent, non-coherent, and phase noise compensated demodulation.

Next, the performance of an example implementation of one embodiment of the algorithm in accordance with the present invention will be illustrated. It will be compared to both semi-coherent ($\alpha$=0.9) and non-coherent demodulation. The performance in terms of variance $\sigma^2_{error}$ of the error signal is illustrated in FIG. 4 which illustrates a comparison of the variance of the error signal for semi-coherent, non-coherent, and phase noise compensated demodulation. In FIG. 4, $R_1$ and $R_2$ (constant offset and AWGN variance, respectively) have been kept constant during the implementation, and $R_3$ has varied. When showing the results, only AWGN and phase noise are present.

Referring again to FIG. 4, several observations can be made. When the phase noise is small compared to AWGN, then there is little to gain compared to the semi-coherent demodulator because the demodulator cannot counteract AWGN, and this is the major cause for degraded performance. On the other hand, when the phase noise becomes significant, say $R_3/R_2$ >0 dB, then a noticeable improvement is achieved. It is noteworthy that for good channel conditions, for example, when the AWGN is small, then the gain compared to the semi-coherent demodulator can easily exceed 5 dB.

It should be noted that the gain that is achievable by the demodulator of the present invention depends on the relative bandwidth of the phase noise and the bandwidth of the Gaussian noise (which will be determined by the selectivity filter whose bandwidth equals that of the desired signal). Rather than considering the variance of the error signal, the error rate might instead be considered. The exemplary simulations correspond to a setup using 8DPSK in the Bluetooth high-rate mode.

Figure 5:
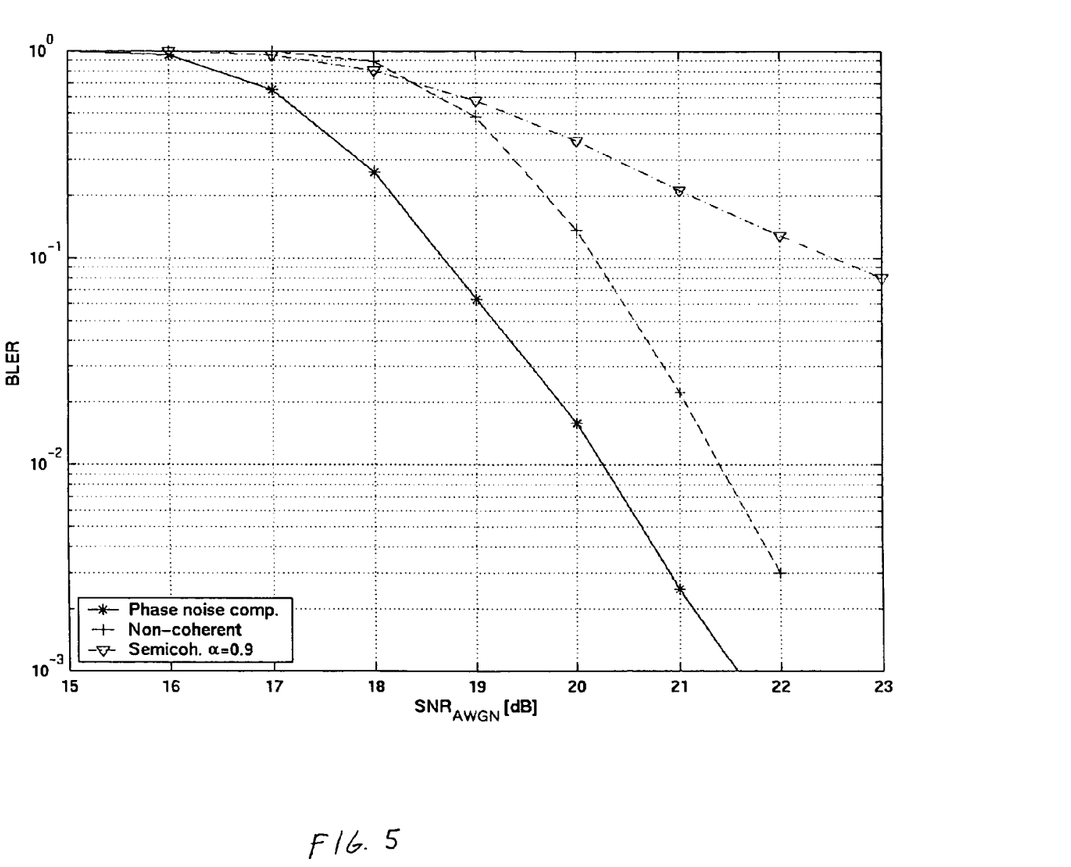
FIG. 5 illustrates block error rate (BLER) versus additive white Gaussian noise signal-to-noise ratio ($SNR_{AWGN}$) for semi-coherent, non-coherent, and phase noise compensated demodulation.

Referring now to FIG. 5, the block error rate (BLER) is depicted as a function of received power. FIG. 5 illustrates BLER versus additive white Gaussian noise signal-to-noise ratio ($SNR_{AWGN}$) for semi-coherent, non-coherent, and phase noise compensated demodulation. The noise in the simulations includes both the narrow-band phase noise at a constant signal-to-noise ratio, $SNR_{PN}$=19.5 dB, and the AWGN for which the SNR varies along the horizontal axis. Thus, for high received power, the phase noise dominates, whereas for low power the AWGN is the major noise source.

The performance with respect to intersymbol interference (ISI) is one of the major motivations for using a more coherent demodulation. To optimize the variance with respect to ISI is equivalent to equalization, which is beyond the scope of this invention. However, for a given structure of the phase noise compensation, the amount of ISI should have an impact on the choice of design parameters. Here, two observations can be made: From the phase noise compensation perspective, ISI acts more like AWGN than phase noise, in the sense that the deviations from the phase reference can be regarded as independent between samples. Given that there is no line-of-sight, the amount of ISI due to multipath propagation, like the phase noise, tends not to depend heavily on the received power in a typical indoor environment. Taken together, a conclusion may be drawn that the choice of design parameters in the phase noise compensation should be a balance between the amount of phase noise on the one hand, and the amount of AWGN+ISI on the other.

The LQG formulation above results in the optimal strategy that minimizes the variance of the error in the phase tracking loop. It can thus be seen as a lower limit for other possible control strategies. The LQG solution in the given example described above requires a fourth order controller, which should be designed dynamically for the actual balance between the disturbance sources. In situations in which it is not desired to use a control which produces an optimal solution, suboptimal control strategies may be used as further described below.

One suboptimal solution is to use order reduction such that a plain semi-coherent controller structure is used, but the choice of $\alpha$ for different disturbance situations is optimized. That is $\alpha$ should be large for operating points dominated by ISI or AWGN, and small for operating points dominated by phase noise. An improved control strategy is to select, for example, a second-order controller structure, and then optimize the parameters for different disturbance situations. This can also be accomplished by replacing the higher-order model given by Equation 23 by a lower-order model given by Equation 14.

The optimal controller is dynamic in its nature, i.e., the actual controller parameters depend on the operating point. In a simplified setting, a fixed design having static design parameters can be made for a region of operation where performance improvements are most crucial. The performance will then be optimal in this region but suboptimal in others. Specifically, the performance will be suboptimal in the regions where the conditions are either very good or very bad. However, in the region where the condition is very good, the performance will still be good enough, although the parameters are not optimal. On the other hand, in the region where the condition is very bad, not even an optimal choice of parameters would be good enough, so there using suboptimal parameters does not make a difference anyway.

Figure 6:
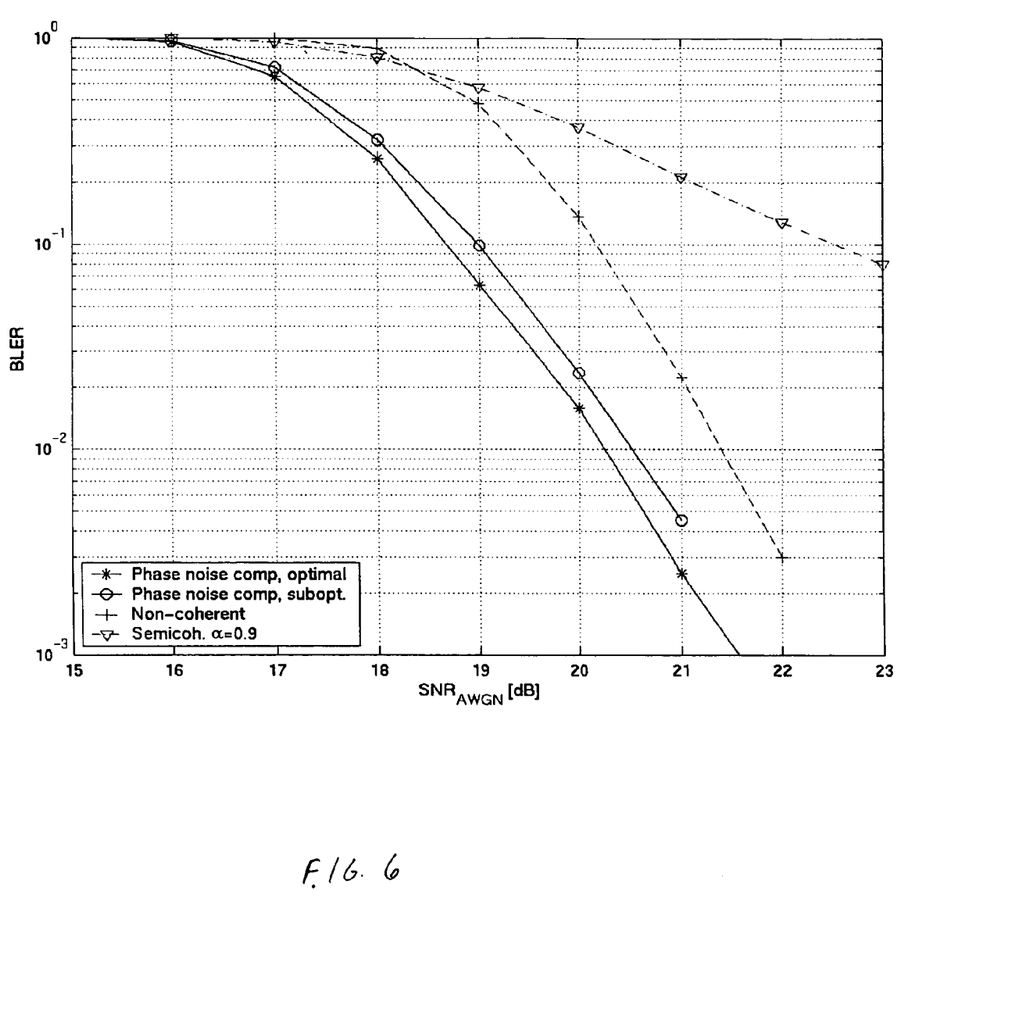
FIG. 6 illustrates a comparison between the block error rate (BLER) performance between suboptimal (low-order and fixed) phase noise compensation, and semi-coherent, non-coherent, and optimal phase noise compensated demodulation.

The performance when using suboptimal control for the exemplary system above will now be illustrated. FIG. 6 depicts the block error rate for a suboptimal solution using both of the simplifications described above, i.e., a fixed second-order controller structure designed at the nominal operating point $SNR_{AWGN}$=20 dB. FIG. 6 illustrates a comparison between the block error rate (BLER) performance between suboptimal (low-order and fixed) phase noise compensation based on Equation 14, and semi-coherent, non-coherent, and optimal phase noise compensated demodulation based on Equation 23. From FIG. 6 it can be concluded that the fixed, low-order controller performs nearly as well as the highorder controller that has been designed for each operating point.

Embodiments of the present invention provide a method and apparatus for minimizing the variance at the input of the decision unit in a decision-directed demodulator in the presence of phase noise, AWGN, and an unknown constant phase reference offset. However, it would be obvious to those skilled in the art that the invention is not limited to this example. The principles of the present invention can be exploited to minimize the variance at the input of the decision unit for any model-based disturbance suppression technique. For example, an extension that may be easily incorporated is a carrier frequency offset, which corresponds to a time-varying phase reference.

It should be emphasized that the terms "comprise", "comprises", and "comprising", when used herein, are taken to specify the presence of stated features, integers, steps, or components, but do not preclude the presence or addition of one or more other features, integers, steps, components or groups thereof.

The previous Detailed Description is of embodiment(s) of the invention. The scope of the invention should not necessarily be limited by this Description. The scope of the invention is instead defined by the following claims and the equivalents thereof.

We claim:

1. A method for compensation of noise in a received signal comprising the steps of:
received a received signal in a demodulator, the received signal comprised of a sum of a transmitted signal and a disturbance signal;
summing the received signal and a compensation signal to produce a demodulation signal;
determining a transmitted symbol based upon the demodulation signal;
determining an error signal by calculating a difference between the demodulation signal and the determined transmitted symbol; and
determining the compensation signal from the error signal using a model-based disturbance suppression control process.

2. The method of claim 1, wherein the model-based disturbance suppression control process comprises a linear disturbance model control process.

3. The method of claim 2, wherein the linear disturbance model control process comprises a linear quadratic Gaussian control process.

4. The method of claim 1, wherein the disturbance signal comprises at least one of phase noise, additive white Gaussian noise, and a constant phase reference offset.

5. The method of claim 1, wherein the disturbance signal comprises a carrier frequency offset.

6. The method of claim 1, wherein the determining of the compensation signal comprises modeling the disturbance signal as an additive white Gaussian noise process.

7. The method of claim 6, wherein the determining of the compensation signal comprises modeling the disturbance signal with a disturbance model l having the equation:

$$l = \begin{bmatrix} \frac{1}{z-1} & 1 \end{bmatrix} \begin{bmatrix} w_1 \\ w_2 \end{bmatrix} = \begin{bmatrix} \frac{1}{z-1} & 1 \end{bmatrix} w$$

wherein $w_1$, $w_2$, and $w$ comprise Gaussian noise processes and z denotes the Z-transform variable.

8. The method of claim 1, wherein the disturbance signal comprises phase noise and wherein the determining of the compensation signal comprises modeling the disturbance signal with a disturbance model l having the equation:

$$l = \begin{bmatrix} \frac{1}{z-1} & 1 & H-n(z) \end{bmatrix} \begin{bmatrix} w_1 \\ w_2 \\ w_3 \end{bmatrix}$$

wherein z denotes the Z-transform variable and $w_1$, $w_2$, and $w_3$ comprise white noise inputs to a phase noise generating subsystem model of the disturbance signal having a transfer function $H_n(z)$.

9. The method of claim 1, wherein the demodulator comprises a semi-coherent demodulator.

10. The method of claim 1, wherein the transmitted signal comprises a Bluetooth radio signal.

11. The method of claim 1, further comprising filtering the received signal using a filter adapted to optimally attenuate the disturbance signal.

12. A demodulator comprising:
a receiver adapted to receive a received signal, the received signal comprised of a sum of a transmitted signal and a disturbance signal;
a summer adapted to sum the received signal and a compensation signal to produce a demodulation signal;
a decision unit adapted to determine a transmitted symbol based upon the demodulation signal;
a subtractor adapted to determine an error signal by calculating a difference between the demodulation signal and the determined transmitted symbol; and
a compensation unit adapted to determine the compensation signal from the error signal using a model-based disturbance suppression control process.

13. The demodulator of claim 12, wherein the model-based disturbance suppression control process comprises a linear disturbance model control process.

14. The demodulator of claim 13, wherein the linear disturbance model control process comprises a linear quadratic Gaussian control process.

15. The demodulator of claim 12, wherein the disturbance signal comprises at least one of phase noise, additive white Gaussian noise, and a constant phase reference offset.

16. The demodulator of claim 12, wherein the disturbance signal comprises a carrier frequency offset.

17. The demodulator of claim 12, wherein the compensation unit is further adapted to determine the compensation signal by modeling the disturbance signal as an additive white Gaussian noise process.

18. The demodulator of claim 12, wherein the determining of the compensation signal comprises modeling the disturbance signal with a disturbance model l having the equation:

$$l = \begin{bmatrix} \frac{1}{z-1} & 1 \end{bmatrix} \begin{bmatrix} w_1 \\ w_2 \end{bmatrix} = \begin{bmatrix} \frac{1}{z-1} & 1 \end{bmatrix} w$$

wherein $w_1$, $w_2$, and $w$ comprise Gaussian noise processes.

19. The demodulator of claim 12, wherein the disturbance signal comprises phase noise and wherein the determining of the compensation signal comprises modeling the disturbance signal with a disturbance model l having the equation:

$$l = \begin{bmatrix} \frac{1}{z-1} & 1 & H_n(z) \end{bmatrix} \begin{bmatrix} w_1 \\ w_2 \\ w_3 \end{bmatrix}$$

wherein z denotes the Z-transform variable and $w_1$, $w_2$, and $w_3$ comprise white noise inputs to a phase noise generating subsystem model of the disturbance signal having a transfer function $H_n(z)$.

20. The demodulator of claim 12, wherein the demodulator comprises a semi-coherent demodulator.

21. The demodulator of claim 12, wherein the transmitted signal comprises a Bluetooth radio signal.

22. The demodulator of claim 12, further comprising a filter adapted to optimally attenuate the disturbance signal.

* * * * *

UNITED STATES PATENT AND TRADEMARK OFFICE
CERTIFICATE OF CORRECTION

PATENT NO.        : 7,903,769 B2
APPLICATION NO.   : 11/301100
DATED             : March 8, 2011
INVENTOR(S)       : Wallen et al.

Page 1 of 3

It is certified that error appears in the above-identified patent and that said Letters Patent is hereby corrected as shown below:

On the Title Page, in Field (56), under "OTHER PUBLICATIONS", in Column 2, Line 3, delete "UA," and insert -- USA, --, therefor.

On Title Page 2, in Field (56), under "OTHER PUBLICATIONS", in Column 1, Line 6, delete "XP010608706: ISBN;" and insert -- XP010608706; ISBN: --, therefor.

On Title Page 2, in Field (56), under "OTHER PUBLICATIONS", in Column 1, Line 10, delete "111," and insert -- III, --, therefor.

On Title Page 2, in Field (56), under "OTHER PUBLICATIONS", in Column 1, Line 18, delete "375-379." and insert -- 375-379, --, therefor.

Delete fig. 2C and substitute therefor the drawing sheet, consisting of fig. 2C as shown on the attached page.

In Column 4, Line 51, in Equation (4), delete "$r_i=\alpha *r_{i-1}+(1-\alpha)*u_i i=1,2,3$" and insert -- $r_i=\alpha *r_{i-1}+(1-\alpha)*u_i \quad i=1,2,3$ --, therefor In Column 6, Line 8, delete " $\phi_{rec}=\phi_{sent}^{+l}$ " and insert -- $\phi_{rec}=\phi_{sent}+l$ --, therefor.

In Column 6, Line 26, delete " $(\phi_{err}=\phi_{dem}^{-}$ " and insert -- $(\phi_{err}=\phi_{dem}^{-}$ --, therefor.

In Column 7, Line 62, in Equation (10), delete " $u(k)=-\hat{x}_2(k+1|k)=-[0 \ 1]A\hat{x}(k|k)=-L\hat{x}(k|k)$ " and Signed and Sealed this
Twelfth Day of July, 2011

David J. Kappos
*Director of the United States Patent and Trademark Office*

CERTIFICATE OF CORRECTION (continued)
U.S. Pat. No. 7,903,769 B2 insert -- $u(k) = -\hat{x}_2(k+1|k) = -[0 \quad 1]\hat{x}(k+1|k) = -[0 \quad 1]A\hat{x}(k|k) = -L\hat{x}(k|k)$ --, therefor.

In Column 8, Line 26, delete "be" and insert -- be nulled --, therefor.

In Column 9, Line 28, in Equation (15), delete "[0 1 1]x(k+1|k)" and insert -- [0 1 1]x(k+1|k) --, therefor.

In Column 10, Lines 5-6, in Equation (19), delete " $= \dfrac{b_i z^2 + b_2 z + b_3}{z^3 + a_1 z^2 + a_2 z + a_3}$ ," and insert -- $= \dfrac{b_1 z^2 + b_2 z + b_3}{z^3 + a_1 z^2 + a_2 z + a_3}$ --, therefor.

In Column 10, Line 66, in Equation (24), delete "[0 1 1 0 0]x(k+1|k)" and insert -- [0 1 1 0 0]x(k+1|k) --, therefor.

In Column 13, Lines 48-50, in Claim 8, delete " $H - n(z) \begin{bmatrix} w_1 \\ w_2 \\ w_3 \end{bmatrix}$ " and insert -- $H_n(z) \begin{bmatrix} w_1 \\ w_2 \\ w_3 \end{bmatrix}$ --, therefor.